US005211465A

United States Patent [19]

Suzuki

[11] Patent Number: 5,211,465

[45] Date of Patent: May 18, 1993

[54] PROJECTION TYPE VEHICULAR HEADLAMP

[75] Inventor: Yoshinobu Suzuki, Shizuoka, Japan

[73] Assignee: Koito Manufacturing Co., Ltd., Tokyo, Japan

[21] Appl. No.: 713,482

[22] Filed: Jun. 11, 1991

[30] Foreign Application Priority Data

Jun. 25, 1990 [JP] Japan .................................. 2-164141

[51] Int. Cl.[5] ............................................ B60Q 1/00

[52] U.S. Cl. ..................................... 362/61; 362/247; 362/309; 362/332

[58] Field of Search ................. 362/91, 309, 308, 328, 362/245, 332, 80, 82, 83, 247, 248

[56] References Cited

U.S. PATENT DOCUMENTS

| | | | |
|---|---|---|---|
| 3,539,799 | 11/1970 | Dangauthier | 362/238 |
| 4,631,642 | 12/1986 | Brun | 362/61 |
| 4,796,171 | 1/1989 | Lindae et al. | 362/308 |
| 4,895,693 | 1/1990 | Suzuki et al. | 362/91 |

FOREIGN PATENT DOCUMENTS

| | | |
|---|---|---|
| 0273353 | 12/1987 | European Pat. Off. . |
| 2810680 | 12/1980 | Fed. Rep. of Germany . |
| 3703129A1 | 8/1988 | Fed. Rep. of Germany . |
| 3827594C2 | 10/1991 | Fed. Rep. of Germany . |
| 1013105 | 7/1952 | France . |
| 2013967 | 10/1970 | France . |
| 287088 | 2/1929 | United Kingdom . |

*Primary Examiner*—James C. Yeung
*Attorney, Agent, or Firm*—Sughrue, Mion, Zinn, Macpeak & Seas

[57] ABSTRACT

A projection type vehicular headlamp in which a projection lamp unit comprising a reflector accommodating a light source, and a projection lens unitary formed through a lens holder with the reflector is provided in a lamp chamber defined by a lamp body and an outer lens, which is characterized in that diffusion steps are formed in the border region between a projection light transmitting region of the outer lens which is adapted to transmit the output light of the projection lens, and the remaining.

13 Claims, 3 Drawing Sheets

PROJECTION TYPE VEHICULAR HEADLAMP

BACKGROUND OF THE INVENTION

1. Field of the Invention

The present invention relates to a headlamp for an automobile, a motorcycle or a motor-driven bicycle (hereinafter typically referred to as "a vehicular headlamp", when applicable), and more particularly to a projection type vehicular headlamp in which a light beam emitted from a light source and reflected by a reflector is irradiated through a projection lens.

There has been known vehicular headlamps of the projection type as disclosed, for example, in U.S. Pat. No. 4,631,642. The headlamp of this type is so designed that, as shown in FIG. 1, the light beam emitted from a light source, namely, a light bulb 2, is reflected by a reflector 3, and the light beam thus reflected is irradiated through a projection lens 4. The reflector 3 accommodating the light bulb 2, and a lens holder 5 holding the projection lens 4 are unitary engaged with each other thereby forming a projection unit 1.

Recently, the headlamp thus designed has been extensively employed in the art, because, when compared with a headlamp using a parabolic reflector, it is compact and large in the quantity of light, and provides a desired clear cut-off line.

However, the employment of the projection type headlamp for a motorcycle suffers from the following difficulties: Since the projection type headlamp is large in light intensity, as shown in FIG. 2 irradiation area A and the non-irradiation area B formed in front of the motor cycle are excessively different in brightness, and the visibility is low at the border region C (shaded in FIG. 2) between these two areas A and B.

SUMMARY OF THE INVENTION

Accordingly, an object of this invention is to eliminate the above-described difficulties accompanying a conventional projection type headlamp. More specifically, an object of the present invention is to provide a projection type vehicular headlamp with which the visibility is high at the border region between the irradiation area and the non-irradiation area formed by the projection light beam.

The foregoing and other objects of the invention can be achieved by a provision of a projection type vehicular headlamp in which a projection lamp unit comprising a reflector accommodating a light source, and a projection lens unitarily formed through a lens holder with the reflector is provided in a lamp chamber defined by a lamp body and an outer lens, which is characterized in that diffusion steps are formed in the border region between a projection light transmitting region of the outer lens which is adapted to transmit the output light of the projection lens, and the remaining portions of the lens.

The diffusion steps formed in the border region between the projection light transmitting region of the outer lens and the remaining diffuse the light, whereby the difference in brightness between the irradiation area and the non-irradiation area of the projection light is reduced as much.

DETAILED DESCRIPTION OF THE PREFERRED EMBODIMENT

The present invention will now be described in detail with reference to the accompanying drawings.

Figure 1:
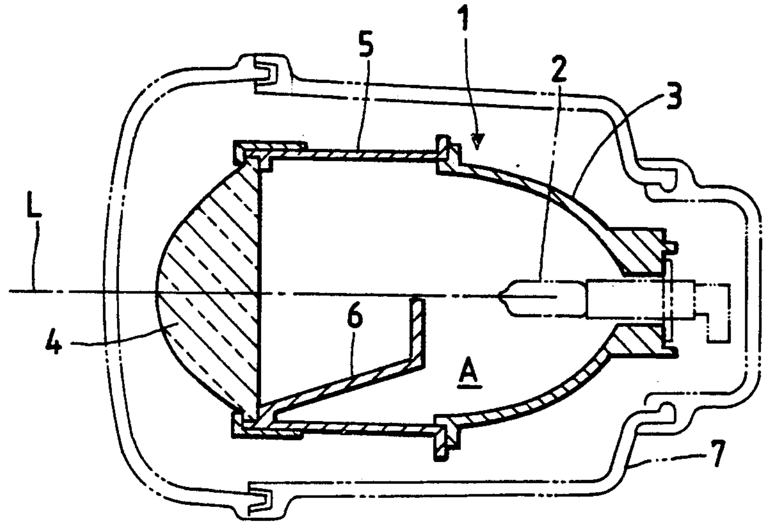
FIG. 1 PRIOR ART
FIG. 1 is a vertical sectional view of a conventional projection type headlamp.
Figure 2:
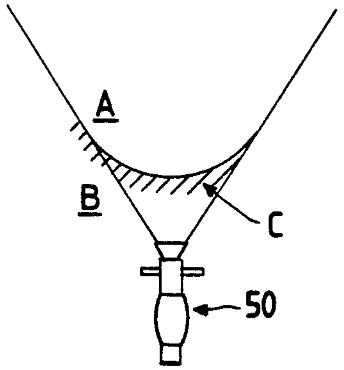
FIG. 2 is a diagram showing the irradiation area and the non-irradiation area of the conventional projection type headlamp.
Figure 7:
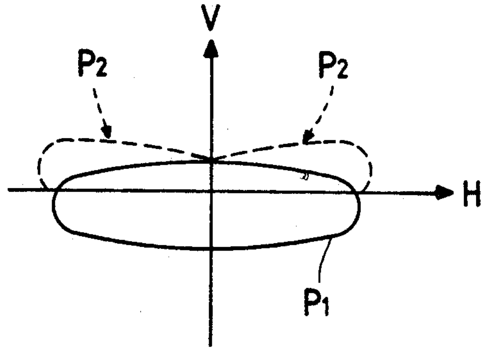
FIG. 7 is a diagram showing the light distribution pattern of the headlamp.
Figure 8:
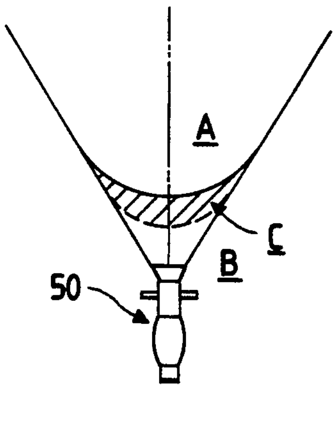
FIG. 8 is a plan view showing the irradiation area and the non-irradiation area of the headlamp.
Figure 3:
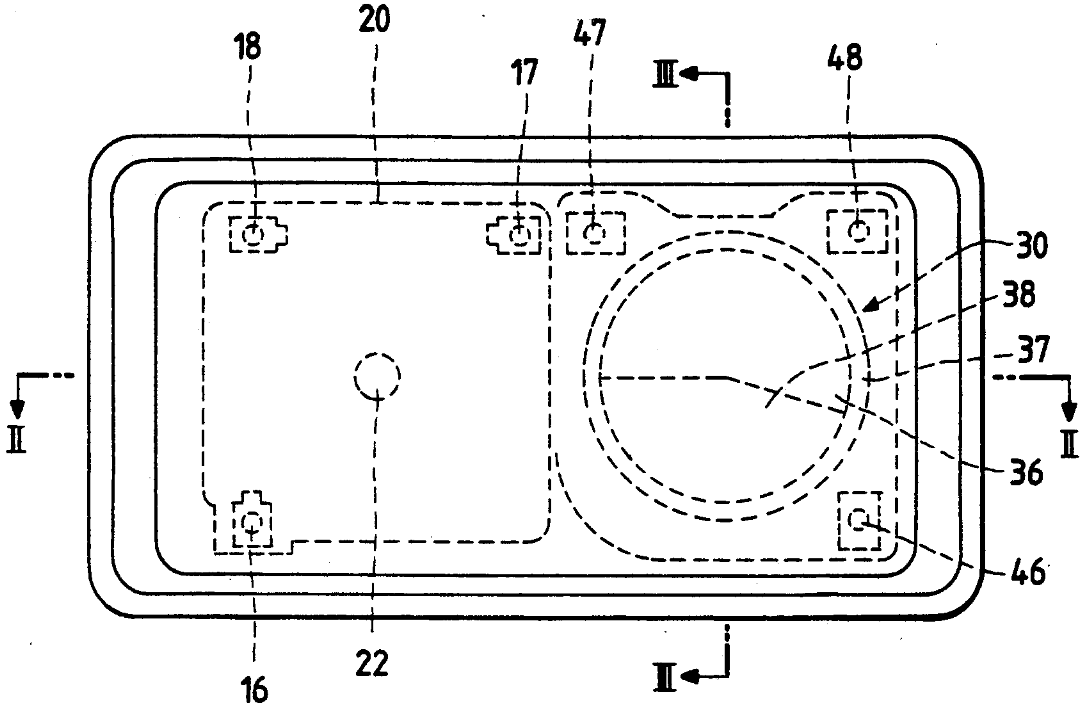
FIG. 3 is a front view of a projection type motorcycle headlamp which constitutes one embodiment of this invention.
Figure 4:
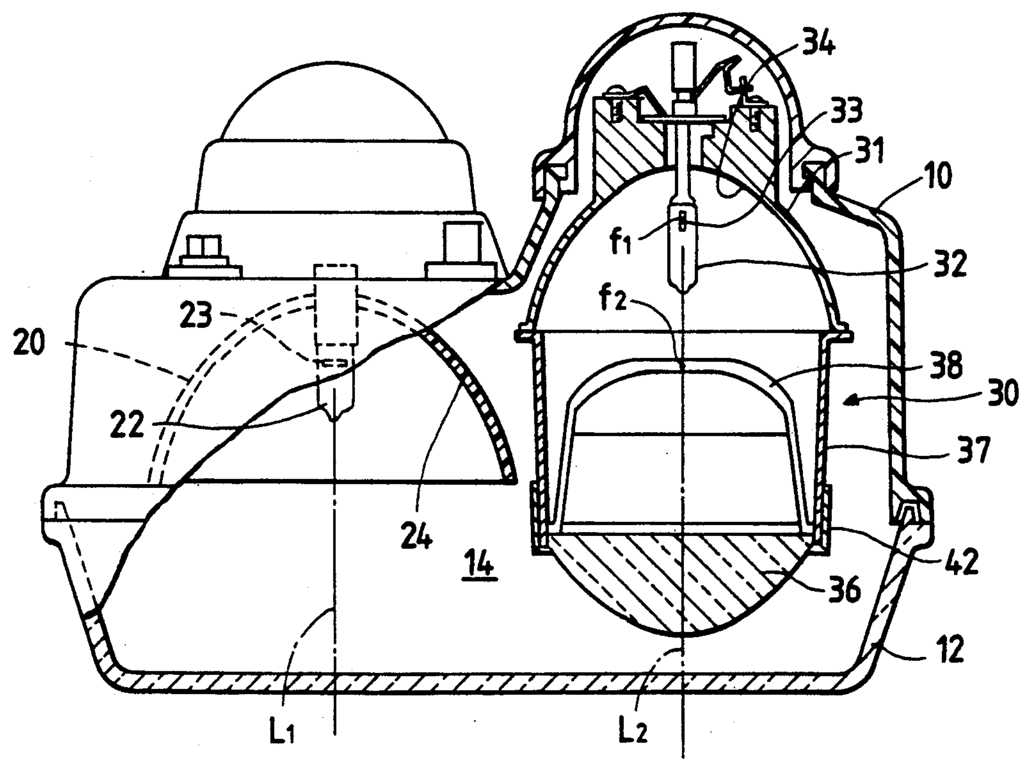
FIG. 4 is a horizontal sectional view taken along line IV—IV in FIG. 3.
Figure 5:
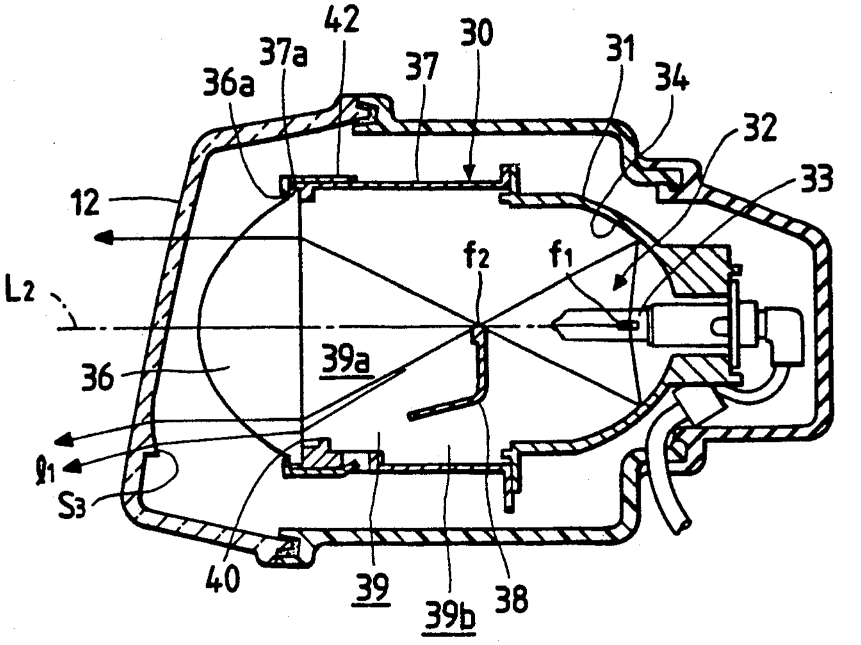
FIG. 5 is a vertical sectional view taken along line V—V in FIG. 3; o
Figure 6:
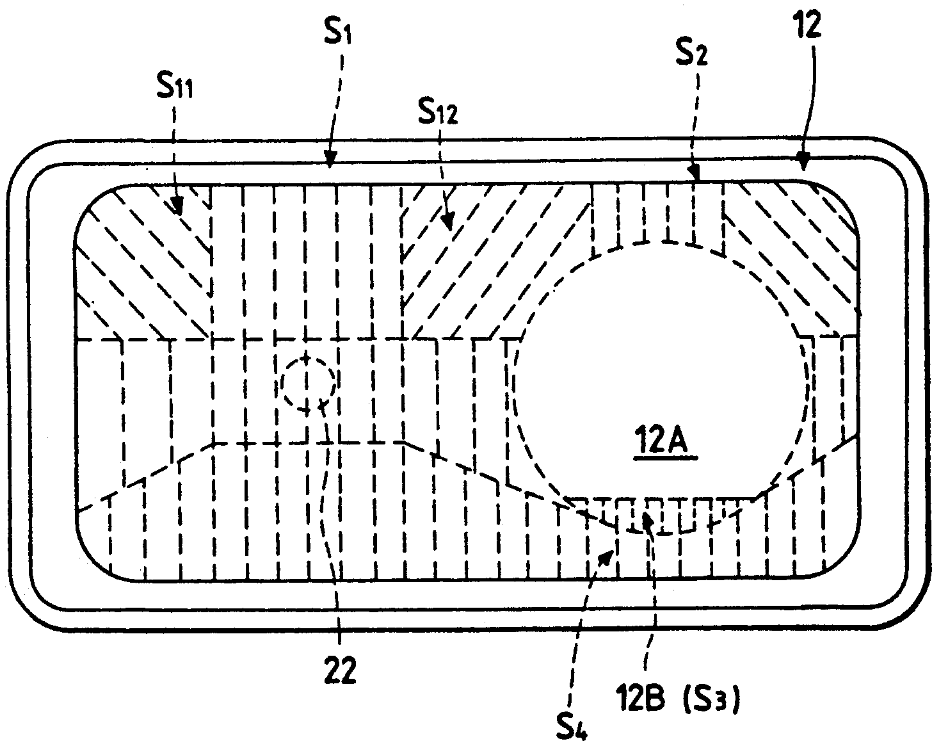
FIG. 6 is a front view of an outer lens, showing diffusion steps formed on it.

FIGS. 3 through 8 show a projection type motorcycle headlamp which constitutes one embodiment of the invention. More specifically, FIG. 3 is a front view of the headlamp, FIG. 4 is a horizontal sectional view taken along line IV—IV in FIG. 3, FIG. 5 is a vertical sectional view taken along line V—V in FIG. 3, FIG. 6 is a front view of an outer lens, showing diffusion steps formed on the outer lens, FIG. 7 is a diagram showing the light distribution pattern of the headlamp, and FIG. 8 is a plan view showing the irradiation area of the headlamp.

In these figures, reference numeral 10 designates a container-shaped lamp body. An outer lens 12 is fitted in a front opening of the lamp body 10, thus defining a lamp chamber 14. A reflector 20 for a main beam in which a light bulb 22 is fixedly inserted, and a projection unit 30 for a sub-beam for emitting a light beam are disposed side by side in the lamp body 10.

The inner surface of the reflector 20 is formed into a parabolic light reflecting surface 24. The reflector has a bulb inserting hole formed in its parabolic rear end portion, and the light bulb 22 is inserted into the bulb inserting hole from behind the reflector 20. The light beam emitted from a filament 23 of the bulb 22, being reflected from the light reflecting surface 24, is applied to the outer lens 12, as a parallel light beam where it is diffused in a predetermined direction by a diffusion step group $S_1$ shown in FIG. 6 formed on the outer lens 12. A diffusion step group $S_{11}$ adapted to diffuse light upwards to the right and a diffusion step group $S_{12}$ adapted to diffuse light upwards to the left are formed on the outer lens 12 at the upper right region and the upper left region, respectively. Hence, as shown in FIG. 7, in this case the irradiation region above the horizontal level H is spread to the right and to the left as indicated at $P_2$ and $P_2$ when compared with the irradiation region $P_1$ which is formed in the case where the diffusion step groups $S_{11}$ and S are the same as the diffusion step group $S_1$. Accordingly, the visibility is high when the driver is travelling around curves, and the visibility of the driver at a long distance is improved.

As shown in FIG. 3, the reflector 20 is supported on three points; that is, two aiming screws 16 and 17 which are threadably engaged with the rear wall of the lamp body in such a manner that they can be moved forwardly or backwardly, and a tilt fulcrum 18, which is of a ball joint structure, protruded forwardly from the lamp body rear wall which is in the form of a ball joint.

That is, the reflector can be tilted by turning the aiming screws 16 and 17, so that the axis of irradiation $L_1$ can be tilted vertically and horizontally.

The projection lamp unit 30 comprises an elliptic reflector 31 accommodating a light bulb 32 and a lens holder 37 which holds a projection lens 36 and which holder is fitted in the front opening of the reflector 31. The inner surface of the reflector 31 is formed into a light reflecting surface 34 by vacuum deposition of aluminum. A bulb inserting hole is formed in the elliptic rear end portion of the reflector 31. A light bulb 32 is inserted into the bulb inserting hole from behind the reflector 31. A filament 33 of the light bulb 32 is positioned at the first focal point $f_1$ of the optical reflecting surface 34. The light reflected from the optical reflecting surface 34, as shown in FIG. 5 crosses at the axis of irradiation (or the optical axis) $L_2$ and advances to the projection lens 36.

An annular-flange-shaped engaging recess 37*a* is formed on the inner wall of the front end portion of the lens holder 37 near the edge, and the flange-shaped peripheral portion 36*a* of the lens 36 is engaged with to the engaging recess 37*a* with silicon adhesive. Under this condition, the lens 36 is fixedly secured to the front end portion of the lens holder 37 by staking an annular metal band 42. Inside the lens holder 37, a clear cut-off forming shade 38 formed integral with the lens holder 37 blocks substantially the lower half of the optical path. The lens holder 37 and the shade 38 are formed, as one unit, by aluminum die casting in such a manner that the shade has an opening 39 in its lower portion through which air flows between spaces 39*a* and 39*b* located on forward and rear sides of the shade 39. That is, in the projection lamp unit 30, the heat convection occurring due to by the provision of the opening 39 of the shade 38, so that the radiation of heat is improved as much. The upper end of the shade 38 is located in the vicinity of the point $f_2$ on which the axis of the light $L_2$ passes, and at the focal length of the lens 36 from the latter 36.

A part of the outer lens 12 confronting with the projection unit 30 is formed into a projection light transmitting region 12A as shown in FIG. 6. The region 12A is in the form of a circle larger in diameter than the projection lens 36 on which no steps are provided. The light reflected from the light reflecting surface 34 is supplied to the projection lens 36, so that it is projected forwardly by the latter 36. In this case, a clear cut-off line is formed in the resultant light distribution pattern in accordance with the configuration of the upper edge contour of the shade 38. As shown in FIG. 5, the holder 37 is provided with a block wall 40 extending upwardly from the lower edge of the opening 39. The block wall 40 blocks the undesired light; that is, the block wall 40 is provided to eliminate the difficulty that, otherwise, the light reflected from the inner cylindrical wall of the lens holder 37 is applied to the projection lens 36 through the opening 39, thus appearing above the clear cut-off line. In the region of the outer lens 12 other than the projection light transmitting region 12A, a diffusion step group $S_2$ corresponding in configuration to the diffusion step $S_1$ is formed in the left half of the outer lens. That is, the front surface of the outer lens 12 is consistent in pattern. Hence, even when turned off, the lamp unit demonstrates an uniform appearance.

A diffusion step group $S_3$ is formed in the arcuate lower end portion 12B of the projection light transmitting region 12A of the outer lens 12 as shown in FIGS. 5 and 6 in such a manner that the surfaces of diffusion steps are larger in curvature with respect to the vertical plane towards the lower end of the arcuate lower portion 12B. The diffusion step group $S_3$ extending vertically is constituted by a plurality of lens elements. Further, the diffusion step group $S_4$ positioned adjacent the diffusion step group $S_3$ extends in the same direction as that of the diffusion step group $S_3$. The pitches of the lens elements are arranged similarly. Therefore, the diffusion step $S_3$ group and the step group $S_4$ group demonstrate an uniform appearance. The light supplied to the diffusion steps formed in region 12B is diffused downwardly as indicated at $l_1$ in FIG. 5 when emerging therefrom, whereby the excessive differences in brightness between the irradiation area and the non-irradiation area is reduced. FIG. 8 shows the irradiation area of the headlamp according to the invention. In FIG. 8, reference numeral 50 designates a part of the motor; cycle body. In this case, a parabolic border region C is formed between the irradiation area A and the non-irradiation area B; however, since part of the projection light is applied to the border region C being diffused by the diffusion step group $S_3$, the brightness of the border region C becomes smaller towards the non-irradiation area B from the irradiation area A. That is, the difference in brightness at the border region C is smaller than in the conventional art. More specifically, the brightness is not abruptly changed at the border region C. Accordingly, even in the non-irradiation area B, since it is bright up to near the motorcycle 50, the visibility for the driver is improved.

The projection lamp unit 30 is supported on three points. That is, two aiming screws 46 and 47 which are threadably engaged with the rear wall of the lamp body in such a manner that they can be moved forwardly and backwardly, and a tilt fulcrum 48. By turning the aiming screws 46 and 47, the axis of irradiation $L_2$ of the projection lamp unit 30 can be tilted vertically and horizontally independently of the reflector 20. Although the invention is described above with reference to a main beam of a headlamp, the invention is not limited thereto or thereby. For example, the basic concept of the invention can also be applied to a clearance lamp, turn signal lamp or the like.

While the invention has been described with reference to a motorcycle, the technical concept of the invention is equally applicable to headlamps for motor-driven bicycles and automobiles.

As was described above, in the projection type vehicular headlamp according to the present invention, the diffusion steps formed in the border region between the projection light transmitting region of the outer lens which transmits the light of the projection lens and the remaining regions diffuse the projection light of the outer lens, whereby the difference in brightness between the irradiation area and the non-irradiation area is decreased. Hence, for the driver, the visibility is improved as much, and accordingly the driving of the automobile can be achieved with high safety.

What is claimed is:

1. A projection type vehicular lamp, comprising:

a projection lamp unit accommodating a light source, said projection lamp unit comprising an elliptic reflector for accommodating said light source, a tubular holder fixed to said elliptic reflector and a projection lens fitted on said holder at an end thereof opposite said elliptic reflector;

a lamp body having a front opening for accommodating said projection lamp unit; and an outer cover fixed to said front opening of said lamp body, a beam emitted from said projection lamp unit passing through a circular projection light transmitting region on said outer cover, diffusion steps being formed in an area of said projection light transmitting region defined between a horizontal chord passing through a lower portion of said projection light transmitting region and a lower arcuate boundary of said projection light transmitting region, and in said outer cover diametrically outside of and surrounding said projection light transmitting region, areas of said projection light transmitting region other than said area defined between said chord and said lower boundary being free of said diffusion steps, said diffusion steps in said projection light transmitting region reflecting a portion of light from said beam emitted from said projection lamp unit in a downward direction so as to reduce a difference in brightness between an irradiation area and a non-irradiation area between said irradiation area and a vehicle on which said lamp is mounted.

2. The projection type vehicular lamp of claim 1, wherein said diffusion steps have surfaces which increase in curvature with respect to a vertical plane towards a lower end of said area of said projection light transmitting region defined between said horizontal chord and said lower arcuate boundary of said projection light transmitting region.

3. The projection type vehicular lamp of claim 1, wherein said projection lamp unit comprises a shade unitarily formed with said holder for forming a clear cut-off line, said shade being provided with an opening for allowing heat convection in said projection lamp unit.

4. The projection type vehicular lamp of claim 3, wherein said holder and said shade are formed by aluminum die casting.

5. The projection type vehicular lamp of claim 1, wherein said diffusion steps comprise a plurality of lens elements.

6. A vehicular headlamp having a projection type headlamp, comprising:

a first headlamp having a first light source;

a second headlamp providing adjacent said first headlamp and having a second light source, said second headlamp comprising a projection lamp unit accommodating said second light source, said projection lamp unit comprising an elliptic reflector, a holder fixed to said elliptic reflector and a projection lens fitted on said holder at a side opposite said elliptic reflector;

a lamp body having a front opening for accommodating said first and second headlamps;

an outer lens fixed to said front opening of said lamp body, a beam emitted from said projection lamp unit passing through a circular projection light transmitting region on said outer cover, diffusion steps being formed in an area of said projection light transmitting region defined between a horizontal chord passing through a lower portion of said projection light transmitting region and a lower arcuate boundary of said projection light transmitting region, and in said outer cover diametrically outside of and surrounding said projection light transmitting region, areas of said projection light transmitting region other than said area defined between said chord and said lower boundary being free of said diffusion steps, said diffusion steps in said projection light transmitting region reflecting a portion of light from said beam emitted from said projection lamp unit in a downward direction so as to reduce a difference in brightness between an irradiation area and a non-irradiation area between said irradiation area and a vehicle on which said vehicular headlamp is mounted.

7. The projection type vehicular lamp of claim 6, wherein said diffusion steps increase in curvature with respect to a vertical plane towards a lower end of said area of said projection light transmitting region defined between said horizontal chord and said lower arcuate boundary of said projection light transmitting region.

8. The vehicular headlamp of claim 7, wherein a shape of said diffusion steps in said area of said projection light transmitting region defined between said horizontal chord and said lower arcuate boundary of said projection light transmitting region is similar to that of said lens steps in said outer cover diametrically outside of and surrounding said projection light transmitting region.

9. The vehicular headlamp of claim 6, wherein said projection lamp unit comprises a shade unitarily formed with said holder for forming a clear cut-off line, said shade is provided with an opening for allowing a heat convection in said projection lamp unit.

10. The vehicular headlamp of claim 9, wherein said holder and said shade are formed by aluminum die casting.

11. The vehicular headlamp of claim 6, wherein said diffusion steps comprise a plurality of lens elements.

12. The vehicular headlamp of claim 6, wherein said first headlamp is a projection type headlamp.

13. The vehicular headlamp of claim 6, wherein said first headlamp is of a type having a parabolic reflector and a light source fitted in said parabolic reflector.

* * * * *